United States Patent
Park et al.

(10) Patent No.: US 10,056,580 B2
(45) Date of Patent: Aug. 21, 2018

(54) RECHARGEABLE BATTERY

(71) Applicant: SAMSUNG SDI CO., LTD., Yongin-si, Gyeonggi-do (KR)

(72) Inventors: Sang-Kyoon Park, Yongin-si (KR); Yong-Chul Seo, Yongin-si (KR); Seung-Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 161 days.

(21) Appl. No.: 14/733,584

(22) Filed: Jun. 8, 2015

(65) Prior Publication Data

US 2016/0099445 A1 Apr. 7, 2016

(30) Foreign Application Priority Data

Oct. 7, 2014 (KR) .................... 10-2014-0135111

(51) Int. Cl.
| | |
|---|---|
| *H01M 2/06* | (2006.01) |
| *H01M 2/36* | (2006.01) |
| *H01M 2/12* | (2006.01) |
| *H01M 10/04* | (2006.01) |
| *H01M 2/04* | (2006.01) |
| *H01M 2/02* | (2006.01) |

(52) U.S. Cl.
CPC ........... *H01M 2/06* (2013.01); *H01M 2/0217* (2013.01); *H01M 2/0473* (2013.01); *H01M 2/0482* (2013.01); *H01M 2/12* (2013.01); *H01M 2/36* (2013.01); *H01M 10/0431* (2013.01)

(58) Field of Classification Search
CPC ............ H01M 2/06; H01M 2/36; H01M 2/12; H01M 2/0473; H01M 2/0482; H01M 10/0431; H01M 2/0217
See application file for complete search history.

(56) References Cited

U.S. PATENT DOCUMENTS

| | | | |
|---|---|---|---|
| 2010/0086845 | A1 | 4/2010 | Jung et al. |
| 2011/0076528 | A1 | 3/2011 | Lim |

(Continued)

FOREIGN PATENT DOCUMENTS

| | | |
|---|---|---|
| CN | 202454638 U | 9/2012 |
| JP | 2008-204770 A | 9/2008 |

(Continued)

OTHER PUBLICATIONS

English machine translation of Japanese Publication No. JP 2013-025882 A, dated Feb. 4, 2013, 12 pages.

(Continued)

*Primary Examiner* — Eugenia Wang
(74) *Attorney, Agent, or Firm* — Lewis Roca Rothgerber Christie LLP

(57) ABSTRACT

A rechargeable battery includes an electrode assembly comprising electrodes having coated and uncoated regions, being located on opposite sides of a separator and spirally wound together with the separator; a case accommodating the electrode assembly; an insulating plate on the electrode assembly and having a protruding portion and internal terminal holes; and a cap plate sealing the case and having terminal holes, wherein each of the electrode terminals passes through a respective one of the internal terminal holes to protrude from that terminal hole.

12 Claims, 6 Drawing Sheets

(56) References Cited

U.S. PATENT DOCUMENTS

| | | |
|---|---|---|
| 2011/0129725 A1 | 6/2011 | Baek |
| 2012/0009451 A1 | 1/2012 | Yoo |
| 2012/0052341 A1* | 3/2012 | Kim .................. H01M 2/043 429/53 |
| 2012/0214050 A1 | 8/2012 | Kim |
| 2012/0308855 A1 | 12/2012 | Shimizu et al. |
| 2013/0029188 A1* | 1/2013 | Kim .................. H01M 2/0217 429/53 |
| 2013/0078505 A1* | 3/2013 | Kim .................. H01M 2/18 429/179 |
| 2015/0147636 A1 | 5/2015 | Kim |
| 2015/0263330 A1 | 9/2015 | Seo et al. |
| 2015/0340663 A1 | 11/2015 | Minagata et al. |
| 2016/0099444 A1 | 4/2016 | Park et al. |
| 2016/0336574 A1 | 11/2016 | Guen et al. |

FOREIGN PATENT DOCUMENTS

| | | |
|---|---|---|
| JP | 2013-025882 A | 2/2013 |
| JP | 2014-192106 A | 10/2014 |
| KR | 10-2007-0100978 A | 10/2007 |
| KR | 10-2008-0037869 A | 5/2008 |
| KR | 10-2008-0066314 A | 7/2008 |
| KR | 10-2011-0060782 | 6/2011 |
| KR | 10-2012-0006234 A | 1/2012 |
| KR | 10-2012-0024412 | 3/2012 |
| KR | 10-2013-0012539 | 2/2013 |
| KR | 10-2014-0017743 A | 2/2014 |
| WO | WO 2014/002647 A1 | 1/2014 |

OTHER PUBLICATIONS

U.S. Office Action dated May 19, 2017, issued in cross-reference U.S. Appl. No. 14/733,437 (9 pages).
U.S. Final Office Action dated Feb. 26, 2018, issued in U.S. Appl. No. 15/227,833 (17 pages).
EPO Extended Search Report dated Jun. 20, 2017, corresponding to European Patent Application No. 16198113.9 (11 pages).
U.S. Office Action dated Aug. 10, 2017, issued in U.S. Appl. No. 14/946,803 (14 pages).
U.S. Notice of Allowance dated Sep. 6, 2017, issued in U.S. Appl. No. 14/733,437 (5 pages).
U.S. Office Action dated Sep. 22, 2017, issued in U.S. Appl. No. 15/227,833 (19 pages).
U.S. Notice of Allowance dated Feb. 2, 2018, issued un U.S. Appl. No. 14/733,437 (5 pages).

* cited by examiner

RECHARGEABLE BATTERY

CROSS-REFERENCE TO RELATED APPLICATION

This application claims priority to and the benefit of Korean Patent Application No. 10-2014-0135111 filed in the Korean Intellectual Property Office on Oct. 7, 2014, the entire contents of which are incorporated herein by reference.

BACKGROUND

1. Field

The present invention relates to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be used as a power source for driving motors of a hybrid vehicle, an electric vehicle, and the like.

For example, a rechargeable battery typically includes an electrode assembly for performing charging and discharging operations, a case for accommodating the electrode assembly, a cap plate combined to an opening of the case, and electrode terminals through which the electrode assembly is drawn out of the cap plate.

In some cases, to electrically insulate the electrode assembly from the case, the rechargeable battery is provided with an insulating tape at a bottom and side wall of the case and at an external circumference of the electrode assembly.

In the rechargeable battery under a z-axis crush condition, the electrode assembly may be torn, thereby causing an internal short-circuit.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention relates to a rechargeable battery for preventing an electrode assembly from being torn by a cap plate under a z-axis crush condition.

A rechargeable battery according to an exemplary embodiment of the present invention includes: an electrode assembly formed by disposing electrodes having coated and uncoated regions at opposite sides of a separator and then spirally winding the electrodes and the separator; a case for accommodating the electrode assembly; an insulating plate installed above the electrode assembly and provided with a protruding portion and internal terminal holes; and a cap plate combined to an opening of the case, provided with terminal holes to be coupled to the uncoated regions, and thus allowing electrode terminals passed through the internal terminal holes to be drawn out through the terminal holes.

The protruding portion may be formed along an overall width direction of the insulating plate.

A plurality of protruding portions may be formed along a length direction of the insulating plate to be spaced from each other.

Gaskets interposed between the terminal holes of the cap plate and the electrode terminals and between the internal terminal holes of the insulating plate and the electrode terminals may include support flanges that protrude outward of the electrode terminals, and the support flanges may support vicinities of the internal terminal holes of the insulating plate.

The uncoated regions may be coupled to the electrode terminals inside of the insulating plate.

Each of the electrode terminals may include: an internal plate that is coupled to the uncoated regions by welding and is located inside of the insulating plate; a pillar portion that protrudes from the internal plate to outside of the insulating plate and the cap plate through the internal terminal hole and the terminal hole; and an external plate that is coupled to the pillar portion at an outer surface of the cap plate.

Gaskets interposed between the terminal holes of the cap plate and the electrode terminals and between the internal terminal holes of the insulating plate and the electrode terminals may include support flanges that accommodate the internal plates and protrude outward, and the support flanges may support vicinities of the internal terminal holes of the insulating plate.

Internal insulating members accommodating and supporting the electrode terminals may support the vicinities of the internal terminal holes of the insulating plate and the support flanges of the gaskets.

The electrode assembly may be formed as one electrode assembly or two electrode assemblies.

The electrode assembly may be formed as two electrode assemblies, and the uncoated regions of the same polarity may face each other to be coupled to one of the internal plates.

The insulating plate may be provided with an internal vent hole that corresponds to a vent hole provided in the cap plate.

The insulating plate may be provided with an internal electrolyte injection opening that corresponds to an electrolyte injection opening provided in the cap plate.

According to the exemplary embodiment of the present invention, the insulating plate is installed between the electrode assembly and the cap plate, and the protruding portions formed in the insulating plate are directed toward the electrode assembly, thereby having an effect of protecting the electrode assembly from penetration of the cap plate under the z-axis crush condition.

That is, the insulating plate and the protruding portions can prevent the electrode assembly from being torn by the penetration and deformation of the cap plate under the z-axis crush condition.

DETAILED DESCRIPTION

Figure 1:
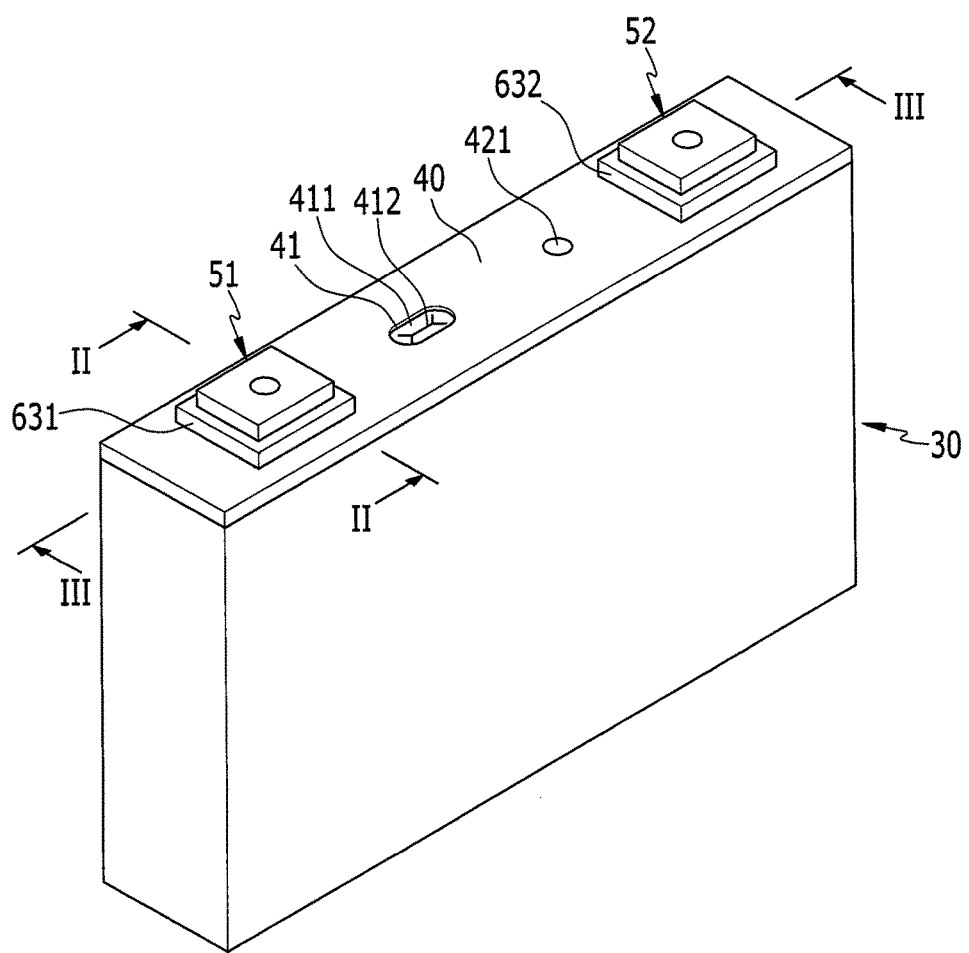
FIG. 1 is a perspective view of a rechargeable battery according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 2:
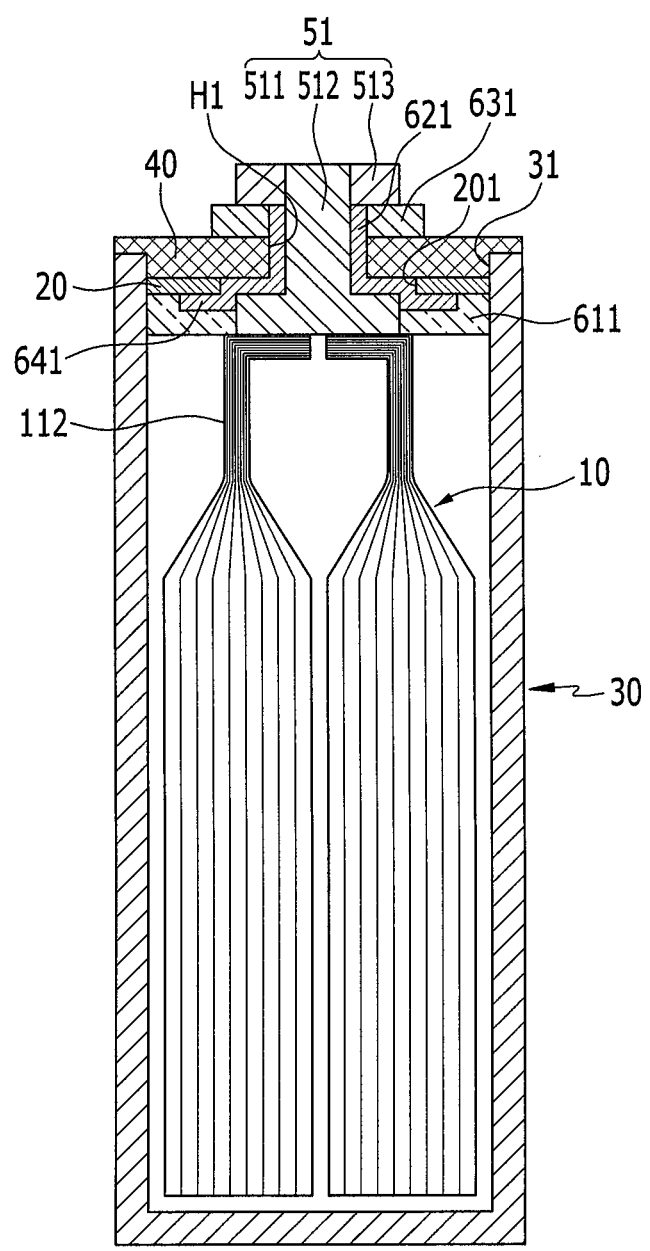
FIG. 2 is a cross-sectional view of FIG. 1 taken along the line II-II.
Figure 3:
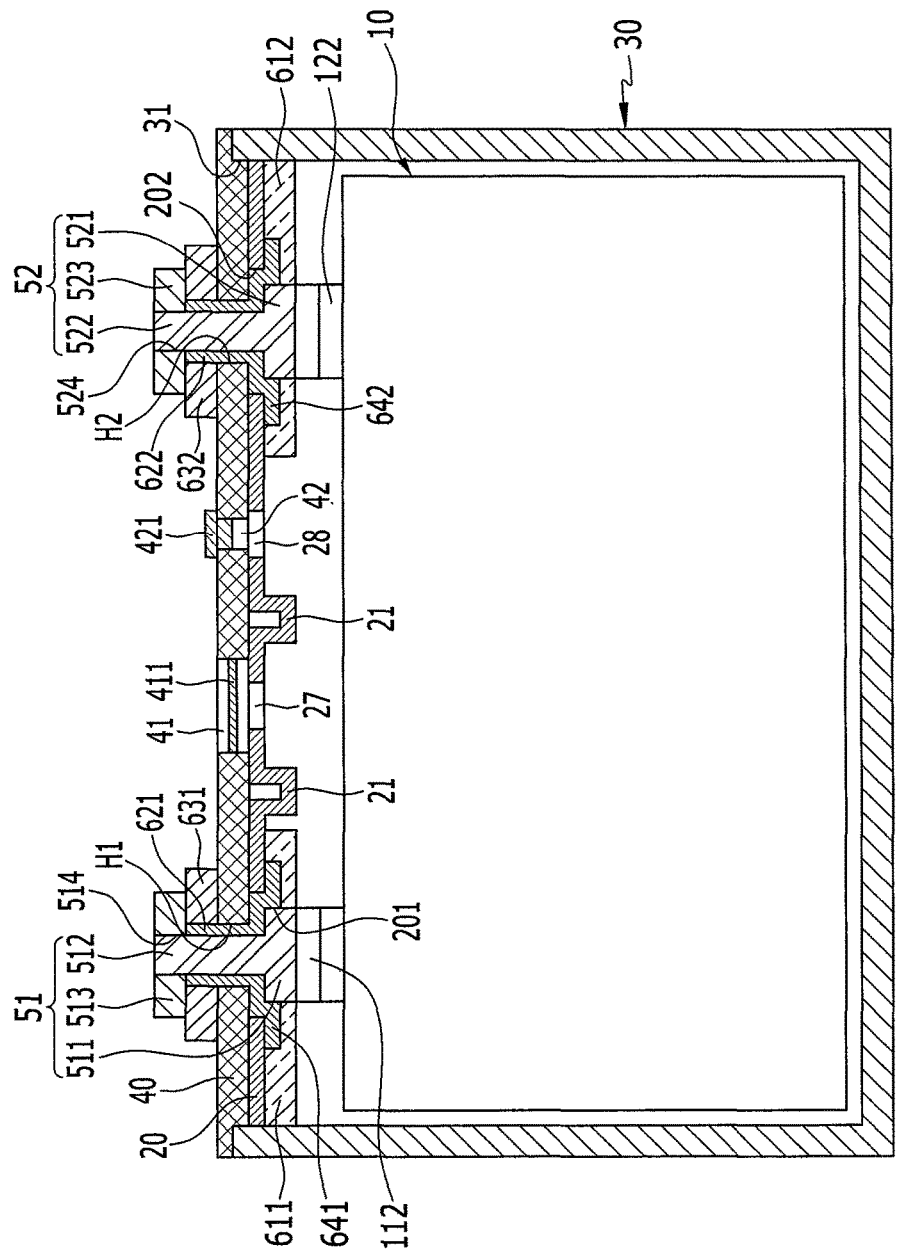
FIG. 3 is a cross-sectional view of FIG. 1 taken along the line III-III.

FIG. 1 is a perspective view of a rechargeable battery according to an exemplary embodiment of the present invention, FIG. 2 is a cross-sectional view of FIG. 1 taken along the line II-II, and FIG. 3 is a cross-sectional view of FIG. 1 taken along the line III-III.

Referring to FIGS. 1 to 3, the rechargeable battery according to the exemplary embodiment includes: an electrode assembly 10 for charging and discharging a current; a case 30 for accommodating the electrode assembly 10; an insulating plate 20 installed above the electrode assembly 10; and a cap plate 40 combined to an opening 31 of the case 30 to seal the opening 31.

Figure 4:
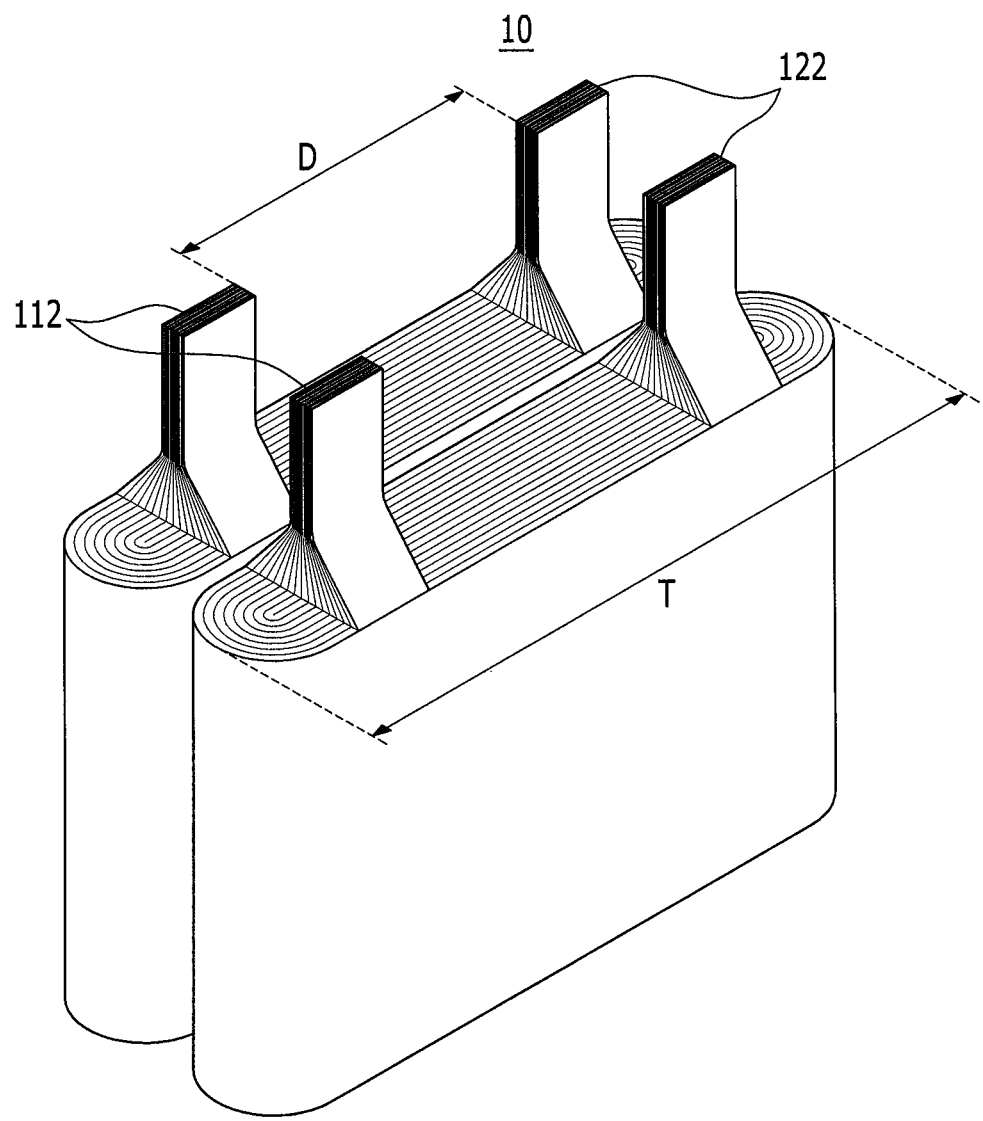
FIG. 4 is a perspective view of an electrode assembly shown in FIG. 2.
Figure 5:
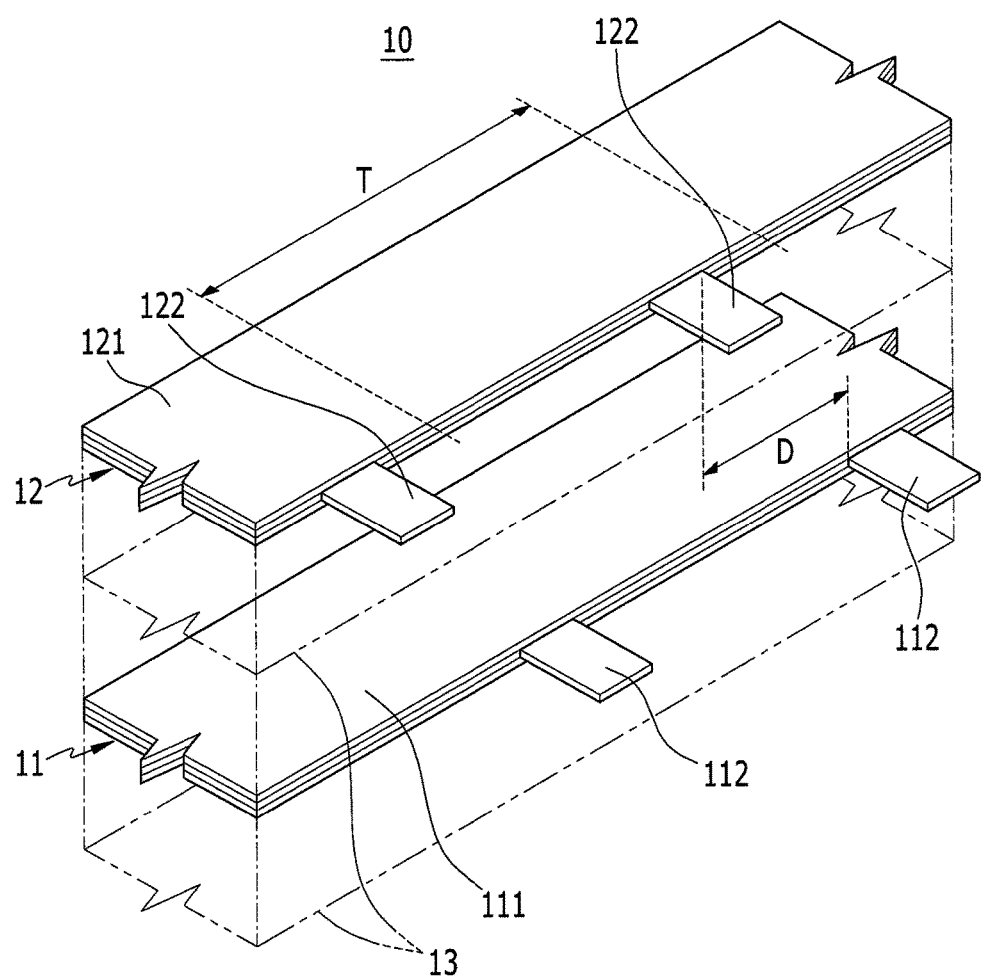
FIG. 5 is an exploded perspective view of the electrode assembly illustrated in FIG. 4.

FIG. 4 is a perspective view of an electrode assembly applied to FIG. 2, and FIG. 5 is an exploded perspective view of the electrode assembly illustrated in FIG. 4.

Referring to FIGS. 4 and 5, the electrode assembly 10 is formed by placing a first electrode 11 (e.g., a negative electrode) and a second electrode 12 (e.g., a positive electrode) at opposite sides of a separator 13, which serves as an electrical insulator, and then spirally winding the negative electrode 11, the separator 13, and the positive electrode 12.

The electrode assembly 10 may be formed as a single electrode assembly, but two electrode assemblies are used in the present exemplary embodiment.

The electrode assembly 10 may be formed to have a plate shape, ends of which have an oval shape (upper and lower ends of FIG. 4) such that they are accommodated in the case 30.

The negative and positive electrodes 11 and 12 respectively include coated regions 111 and 121 where an active material is coated on a current collector formed of a metal foil (e.g., copper or aluminum foil), and uncoated regions 112 and 122 where the active material is not coated thereon to expose the current collector.

The uncoated regions 112 and 122 are located at one end of the spirally wound electrode assembly 10 while being spaced from each other by a distance D from one end thereof within one winding range T of the electrode assembly 10.

In other words, the uncoated regions 112 of the negative electrode 11 are located at one side of one end of the spirally wound electrode assembly 10, and the uncoated regions 122 of the positive electrode 12 are located at the other side of one end of the spirally wound electrode assembly 10 while being spaced from the uncoated regions 112 of the negative electrode 11 by the distance D.

Accordingly, when the negative and positive electrodes 11 and 12 are spirally wound, the uncoated regions 112 of the negative electrode 11 are located to the left of one end of the spirally wound electrode assembly 10 (upper end of FIG. 4), and the uncoated regions 122 of the positive electrode 12 are located to the right of the same end of the electrode assembly 10 (upper end of FIG. 4).

As such, in the negative and positive electrodes 11 and 12, because areas of the coated regions 111 and 121 are maximized and areas of the uncoated regions 112 and 122 are minimized, capacity of the electrode assembly 10 can be increased.

Figure 6:
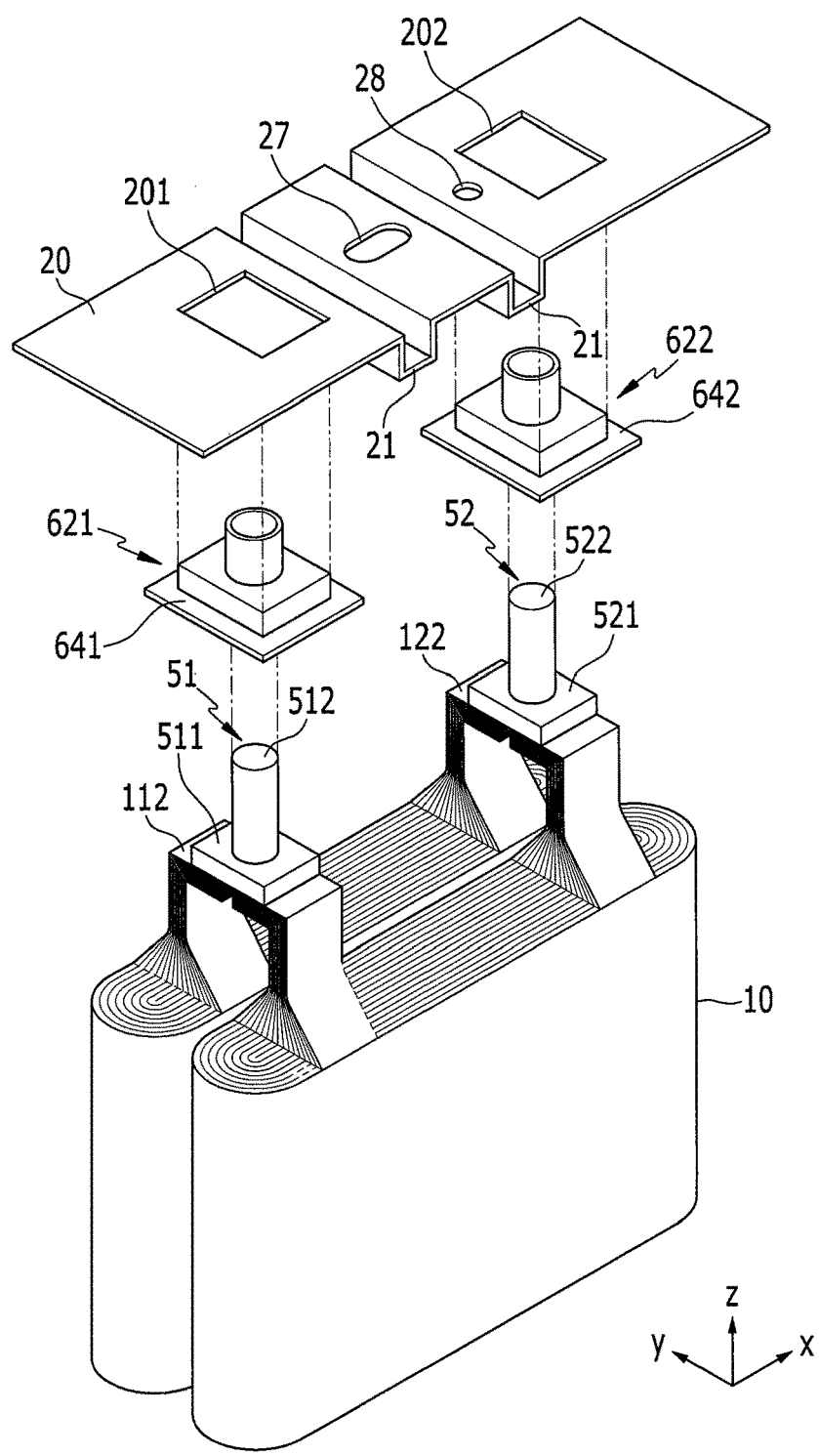
FIG. 6 is an exploded perspective view of gaskets and an insulating plate after negative and positive electrode terminals are coupled to the electrode assembly of FIG. 4.

FIG. 6 is an exploded perspective view of gaskets and an insulating plate after negative and positive electrode terminals are coupled to the electrode assembly of FIG. 4.

Referring to FIGS. 2 to 4 and 6, two electrode assemblies 10 are located in parallel and are electrically coupled to each other.

In other words, in the two electrode assemblies 10, the uncoated region 112 of the negative electrode 11 of one electrode assembly faces the uncoated region 112 of the negative electrode 11 of the other electrode assembly such that they are coupled to each other, and the uncoated region 122 of the positive electrode 12 of one electrode assembly faces the uncoated region 122 of the positive electrode 12 of the other electrode assembly such that they are coupled to each other.

Referring back to FIGS. 1 to 3, the case 30 accommodates the electrode assembly 10 and the insulating plate 20, forms an external appearance of the rechargeable battery, and provides mechanical strength for the rechargeable battery.

The case 30 provides a space for accommodating one electrode assembly 10 or two electrode assemblies 10.

For example, the case 30 is formed to have a substantially cuboid shape, and includes a quadrangular opening 31 at one side into which the electrode assembly 10 can be inserted, a bottom facing and corresponding to the opening 31, and two wide side walls and two narrow side walls that are set between the opening 31 and the bottom.

The insulating plate 20 is provided with internal terminal holes 201 and 202.

Accordingly, while being coupled to the uncoated regions 112 and 122 of the electrode assembly 10 accommodated in the case 30, the first and second electrode terminals 51 and 52 (e.g., negative and positive electrode terminals) and gaskets 621 and 622 are respectively drawn out of the insulating plate 20 through the internal terminal holes 201 and 202.

In other words, in addition to electrically insulating the electrode assembly 10 from the cap plate 40, the insulating plate 20 allows the negative and positive electrode terminals 51 and 52 coupled to the uncoated regions 112 and 122 to be drawn out through the internal terminal holes 201 and 202.

Further, the insulating plate 20 is installed between the electrode assembly 10 and the cap plate 40 and allows the electrode assembly 10 to be protected from the cap plate 40 under a z-axis crush condition.

The cap plate 40 is combined to the opening 31 of the case 30 to seal the case 30, and is provided with two terminal holes H1 and H2.

For example, the negative and positive electrode terminals 51 and 52 are installed in the terminal holes H1 and H2 and the internal terminal holes 201 and 202.

In one embodiment, the case 30 and the cap plate 40 may be formed of aluminum such that they can be welded to each other in the opening 31.

In addition, the cap plate 40 is further provided with a vent hole 41 and an electrolyte injection opening 42.

The vent hole 41 is sealed by a vent plate 411 to discharge internal pressure caused by gas that is generated by the charging and discharging operations of the electrode assembly 10 inside the rechargeable battery.

When the internal pressure of the rechargeable battery reaches a predetermined pressure, the vent plate 411 is ruptured to open the vent hole 41, thereby discharging the gas and the internal pressure.

The vent plate 411 is provided with a notch 412 for inducing the rupture.

After the cap plate 40 is combined and welded to the case 30, the electrolyte injection opening 42 allows the electrolyte solution to be injected into the case 30.

After the electrolyte solution is injected, the electrolyte injection opening 42 is sealed by a sealing cap 421.

Referring back to FIGS. 2, 3, and 6, the negative and positive electrode terminals 51 and 52 are respectively coupled to the uncoated regions 112 and 122 of the electrode assembly 10 to allow the current to be discharged from or charged to the electrode assembly 10.

In an internal space set by the case 30 and the cap plate 40, the insulating plate 20 is located between the cap plate 40 and the electrode assembly 10 to protect the electrode assembly 10 from internal penetration of the cap plate 40 under the z-axis crush condition.

The insulating plate 20 is provided with an internal vent hole 27.

Formed to correspond to the vent hole 41 provided in the cap plate 40, the internal vent hole 27 allows the internal pressure, which is created by a gas generated in the electrode assembly 10, to be delivered to and discharged through the vent hole 41.

In addition, the insulating case 20 is provided with an internal electrolyte injection opening 28.

Formed to correspond to the electrolyte injection opening 42 provided in the cap plate 40, the internal electrolyte injection opening 28 allows the electrolyte solution injected through the electrolyte injection opening 42 to be injected into the insulating case 20.

For example, the insulating plate 20 is provided with a protruding portion 21 that protrudes toward the electrode assembly 10.

In one embodiment, the protruding portion 21 may be formed along an overall width direction of the insulating plate 20, thereby protecting the electrode assembly 10 along the overall width direction under the z-axis crush condition.

In other words, the protruding portion 21 may protrude toward upper ends of the two electrode assemblies 10 to simultaneously protect the two electrode assemblies 10.

When the cap plate 40 penetrates in the z-axis direction under the z-axis crush condition, the protruding portion 21 of the insulating plate 20 blocks the penetration of the cap plate 40 while being supported by the electrode assembly 10.

A plurality of protruding portions 21 may be formed to be spaced from each other along a length direction of the insulating plate 20 (left and right directions in FIG. 6), thereby protecting the electrode assembly 10 at a plurality of positions in the length direction.

The plurality of protruding portions 21 may effectively deal with the z-axis crush condition that occurs at any side of the cap plate 40 in a length direction thereof.

In this case, the protruding portions 21 are provided at opposite lateral sides of the internal vent hole 27 and are spaced from the internal electrolyte injection opening 28 so as to not interrupt the discharging of the internal pressure through the vent hole 41 in the internal vent hole 27 as well as the injection of the electrolyte solution.

In one embodiment, the negative and positive electrode terminals 51 and 52 are installed to pass through the internal terminal holes 201 and 202 of the insulating plate 20 and the terminal holes H1 and H2 of the cap plate 40, and are electrically connected to the electrode assembly 10 through the uncoated regions 112 and 122.

The uncoated regions 112 and 122 are coupled to the negative and positive electrode terminals 51 and 52 that are installed at an inner side of the insulating plate 20, that is, at a side thereof facing the cap plate 40 in the internal terminal holes 201 and 202.

In this case, the uncoated regions 112 and 122 are bent toward the cap plate 40 while being in parallel with the cap plate 40, and are welded to the negative and positive electrode terminals 51 and 52.

The negative and positive electrode terminals 51 and 52 may be formed to have the same structure.

Referring to the drawings to describe, the negative and positive electrode terminals 51 and 52 respectively include internal plates 511 and 521, pillar portions 512 and 522, and external plates 513 and 523.

The internal plates 511 and 521 are formed wider than the pillar portions 512 and 522 such that they can be adequately welded to the uncoated regions 112 and 122, and located further inside than the cap plate 40 and the insulating plate 20.

In one embodiment, the uncoated regions (112, 112; 122, 122) of the two electrode assemblies 10 are bent while facing each other, and are then welded to the internal plates 511 and 521.

The pillar portions 512 and 522 are coupled to the internal plates 511 and 521, and protrude, along with the gaskets 621 and 622, out of the cap plate 40 through the internal terminal holes 601 and 602 and the terminal holes H1 and H2.

The external plates 513 and 523 are electrically coupled to the pillar portions 512 and 522 at an outer surface of the cap plate 40.

The pillar portions 512 and 522 are caulked or welded to the external plates 513 and 523 to be coupled thereto.

Accordingly, the electrode assembly 10 can be drawn out of the case 30 through the uncoated regions 112 and 122 and the negative and positive electrode terminals 51 and 52.

In addition, since the uncoated regions 112 and 122 are directly coupled to the negative and positive electrode terminals 51 and 52, a structure for drawing the electrode assembly 10 out of the case 30 can be simplified.

In one embodiment, the gaskets 621 and 622 are located between the negative and positive electrode terminals 51 and 52 and the cap plate 40 and between the negative and positive electrode terminals 51 and 52 and the insulating plate 20 to electrically insulate and seal between the negative and positive electrode terminals 51 and 52 and the cap plate 40 and to seal between the negative and positive electrode terminals 51 and 52 and the insulating plate 20.

The gaskets 621 and 622 are installed between the pillar portions 512 and 522 of the negative and positive electrode terminals 51 and 52 and inner sides of the terminal holes H1 and H2 of the cap plate 40 to seal and electrically insulate between the pillar portions 512 and 522 and the terminal holes H1 and H2 of the cap plate 40.

Further, the gaskets 621 and 622 are also installed between the pillar portions 512 and 522 of the negative and positive electrode terminals 51 and 52 and inner sides of the internal terminal holes 201 and 202 of the insulating plate 20 to seal between the pillar portions 512 and 522 and the internal terminal holes 601 and 602 of the insulating plate 20.

Because one side of each of the internal insulating members 611 and 612 is attached to the insulating plate 20 while the other side partially encloses the internal plate 511 and 521 of the negative and positive electrode terminals 51 and 52 and the gaskets 621 and 622, a connecting structure between the negative and positive electrode terminals 51 and 52 and the uncoated regions 112 and 122 can be stabilized.

The gaskets 621 and 622 are provided with support flanges 641 and 642 that protrude outward of the negative and positive electrode terminals 51 and 52.

The support flanges 641 and 642 support and may be coupled to vicinities or edges of the internal terminal holes 201 and 202 of the insulating plate 20.

More specifically, in the gaskets 621 and 622, the support flanges 641 and 642 accommodate the internal plates 511 and 521, protrude outward of the internal plates 511 and 521, and support the vicinities of the internal terminal holes 201 and 202 of the insulating plate 20.

In this case, the internal insulating members 611 and 612 accommodate and support the negative and positive electrode terminals 51 and 52, and support the vicinities of the internal terminal holes 201 and 202 of the insulating plate 20, the gaskets 621 and 622, and the support flanges 641 and 642.

After the pillar portions 512 and 522 are inserted into the internal terminal holes 201 and 202 and the terminal holes H1 and H2 with the gaskets 621 and 622 therebetween and then inserted into the coupling holes 514 and 524 of the external plates 513 and 523 with the external insulating members 631 and 632 therebetween, vicinities of the coupling holes 514 and 524 are caulked or welded to allow the pillar portions 512 and 522 to be fixed to the external plates 513 and 523.

As such, the negative and positive electrode terminals 51 and 52 can be installed in the cap plate 40.

In other words, the support flanges 641 and 642 of the gaskets 621 and 622 further seal between the internal insulating members 611 and 612 and the insulating plate 20 and between the internal insulating members 611 and 612 and the cap plate 40.

In the structure where the negative and positive electrode terminals 51 and 52 are installed in the cap plate 40, the gaskets 621 and 622 prevent the electrolyte solution from leaking through the internal terminal holes 201 and 202 and the terminal holes H1 and H2.

In addition, the gaskets 621 and 622 may be further extended between the external insulating members 631 and 632 and the pillar portions 512 and 522 to further seal therebetween.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Symbols

10: electrode assembly
11, 12: first, second electrode (negative, positive electrode)
13: separator
20: insulating plate
21: protruding portion
27: internal vent hole
28: internal electrolyte injection opening
30: case
31: opening
40: cap plate
51, 52: first, second electrode (negative, positive electrode) terminal
41: vent hole
42: electrolyte injection opening
111, 121: coated region
112, 122: uncoated region
201, 202: internal terminal hole -continued Description of Symbols 411: vent plate
412: notch
421: sealing cap
511, 521: internal plate
512, 522: pillar portion
513, 523: external plate
514, 524: coupling hole
611, 612: internal insulating member
621, 622: gasket
641, 642: support flange
D: distance
H1, H2: terminal hole
T: one winding range

What is claimed is:

1. A rechargeable battery comprising:
    an electrode assembly comprising electrodes having coated and uncoated regions, being located on opposite sides of a separator, and spirally wound together with the separator;
    a case accommodating the electrode assembly;
    an insulating plate within the case and having a plurality of protruding portions protruding towards the electrode assembly and located in a central portion of the insulating plate for protecting the electrode assembly by absorbing a crushing force on the cap plate and internal terminal holes; and
    a cap plate sealing the case and having terminal holes, wherein a respective electrode terminal protrudes from each of the internal terminal holes wherein a portion of the insulating plate directly contacts the cap plate wherein all of the protruding portions of the insulating plate protrude away from the cap plate and are entirely spaced from the cap plate, the electrode assembly, and each of the respective electrode terminals, and wherein the plurality of protruding portions are located between the electrode assembly and the cap plate.

2. The rechargeable battery of claim 1, wherein the plurality of protruding portions of the insulating plate extends along an entire width direction of the insulating plate and are disposed between the internal terminal holes of the insulating plate.

3. The rechargeable battery of claim 1, wherein the plurality of protruding portions are spaced from each other in a length direction of the insulating plate.

4. The rechargeable battery of claim 1, further comprising gaskets respectively located between each of the terminal holes of the cap plate and a respective one of the electrode terminals and between each of the the internal terminal holes of the insulating plate and a respective one of the electrode terminals electrode terminals, wherein the electrode terminals each include support flanges that protrude outward, and wherein each of the support flanges support edges of a respective one of the internal terminal holes of the insulating plate.

5. The rechargeable battery of claim 1, wherein the insulating plate is located between an area where the uncoated regions are coupled to the electrode terminals and the cap plate.

6. The rechargeable battery of claim 5, wherein each of the electrode terminals comprises:
    an internal plate that is coupled to the uncoated regions and is located on one side of the insulating plate;
    a pillar portion that protrudes from the internal plate to another side of the insulating plate and the cap plate through a respective one of the internal terminal holes of the insulating plate and a respective one of the terminal holes of the cap plate; and an external plate that is coupled to the pillar portion at an outer surface of the cap plate.

7. The rechargeable battery of claim 6, further comprising gaskets located between the terminal holes of the cap plate and the electrode terminals and between the internal terminal holes of the insulating plate and the electrode terminals, where the gaskets each include support flanges that accommodate the internal plate of a respective one of the electrode terminals and protrude outward, wherein the support flanges support edges of the internal terminal holes of the insulating plate.

8. The rechargeable battery of claim 7, wherein internal insulating members accommodating and supporting the electrode terminals support the edges of the internal terminal holes of the insulating plate and the support flanges of the gaskets.

9. The rechargeable battery of claim 6, further comprising at least one more electrode assembly.

10. The rechargeable battery of claim 9, wherein uncoated regions of the same polarity of the electrode assembly and the at least one more electrode assembly face each other and are coupled to one of the internal plates.

11. The rechargeable battery of claim 1, wherein the insulating plate has an internal vent hole that generally corresponds to a vent hole provided in the cap plate.

12. The rechargeable battery of claim 1, wherein the insulating plate has an internal electrolyte injection opening that generally corresponds to an electrolyte injection opening provided in the cap plate.

* * * * *